May 1, 1951        A. J. ENSOR        2,551,207

TRAILER CARAVAN AND OTHER CABIN STRUCTURE

Filed May 16, 1947        5 Sheets-Sheet 1

Inventor
Arthur John Ensor
by Arthur W. Nelson
Atty.

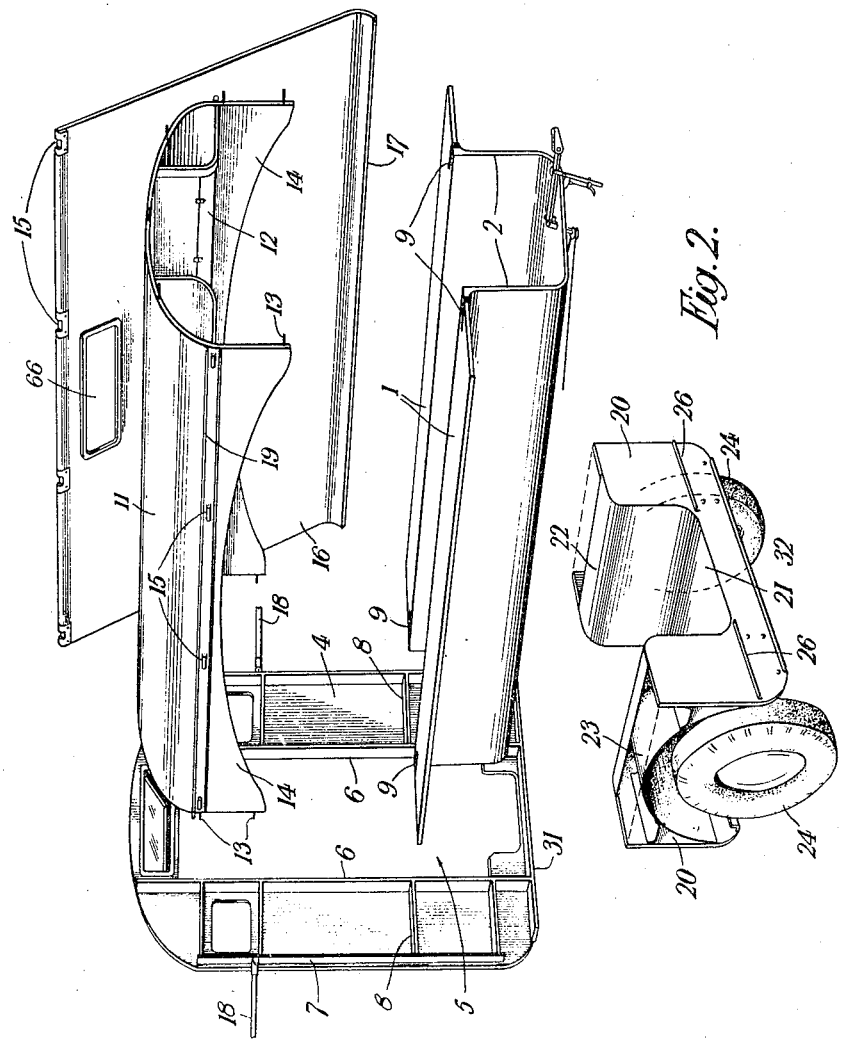

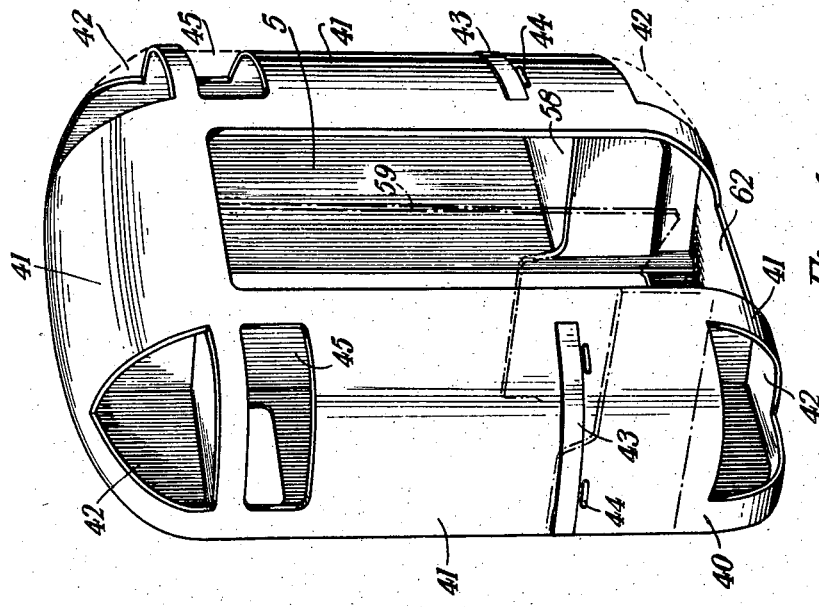

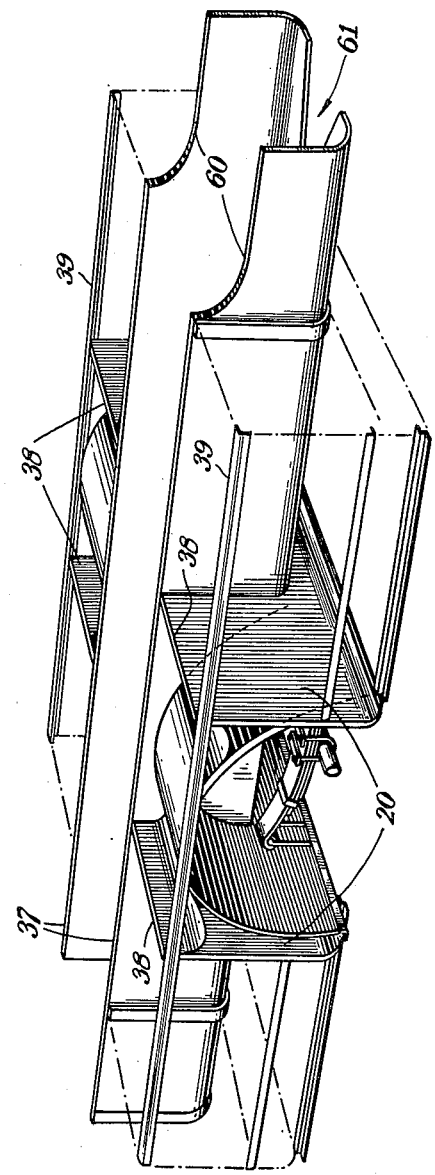

May 1, 1951 A. J. ENSOR 2,551,207
TRAILER CARAVAN AND OTHER CABIN STRUCTURE
Filed May 16, 1947 5 Sheets-Sheet 5

Inventor
Arthur John Ensor
by Arthur M. Nelson
Atty

Patented May 1, 1951

2,551,207

UNITED STATES PATENT OFFICE 2,551,207

TRAILER CARAVAN AND OTHER CABIN STRUCTURE

Arthur John Ensor, Bramley, England

Application May 16, 1947, Serial No. 748,479
In Great Britain May 31, 1946

8 Claims. (Cl. 296—23)

The present invention is concerned primarily with an improved construction of trailer caravan or other cabin structure of the type embodying therein a raised platform or like support for seating, bunks, and/or furnishing units, alongside a gangway and provided with a roof and means for extending the said roof beyond such platform or the like.

A general object of the invention is a construction having platforms or the like raised above a gangway floor and subsidiary collapsible side shelving and/or locker spaces which are externally accessible at a lower level than the platforms under the protection of collapsible cover shields capable of being extended out over them, to provide a cabin suitable for a caravan adapted to be used as a mobile canteen, office or exhibition vehicle, equally well as for camping and the like.

A further object is to arrange such side shelving and/or locker spaces at about the same height above the ground as the platforms or the like are above the gangway floor, so that the effective area available for bunks, tables and other uses is greatly increased when the cabin structure is opened out.

According to the invention in one of its aspects, horizontally extensible side shelving is arranged externally of and at a substantially lower level than the platform or the like, the said roof extension taking the form of a cover shield adapted, after withdrawal of the side shelving from the extended position, to be collapsed adjacent to the said platform or the like to provide a side wall to the cabin.

According to the invention from another aspect, externally accessible locker or bulkhead space is provided beneath the platform or the like, the said roof extension taking the form of a cover shield adapted to be collapsed to provide a side wall to the cabin whereby the platform or the like and the said space beneath it are concealed.

The side shelving may be adapted to be extended in front of the locker or bulkhead space to enlarge the accommodation thereof beneath the shelter of the roof when that is extended. The side shelving may be adapted, when withdrawn from its extended position, to provide an inner closure for the locker or bulkhead space behind the collapsed cover shield. Preferably the side shelving is adapted to be withdrawn by being swung upwardly, and the cover shield by being swung downwardly in front of the withdrawn side shelving. The latter, when horizontally extended, is preferably on substantially the same level as the floor of the gangway.

It will be appreciated that a structure may be arranged in the aforesaid manner on each side of a central gangway. In these circumstances, a longitudinally extending channel or like open top box-section girder member of sheet metal, plywood or other adequately rigid material, may form the backbone of the cabin structure and also the gangway thereof, being supported in a correspondingly formed channel or in aligned channel formations of one or more chassis cradles. Basically, these cradles may comprise transverse plates, spaced apart longitudinally of the gangway backbone, the top edges of which plates are channelled to receive the gangway, the plates also serving as partitions beneath the platforms or like supports, whereby the locker or bulkhead space or spaces can be separated from one or more compartments for road wheels. A suitable chassis unit comprises a single axle and pair of road wheels disposed between two such partition plates, with the wheels and their mud guards on either side of the gangway. The gangway backbone can be secured to the plates of the chassis unit just where required, e. g. with a unit near either end in the case of a four wheel trailer, or with a single unit at say the point of balance in the case of a two wheeler. The spaced plates may also serve when in position, to support or to form part of the platform structures associated with the gangway backbone, the top edges of these plates on either side of the channel wherein the said backbone rests, being preferably at about the same level as the aforementioned top edges of the side walls of the latter. Underslung lockers may be included beneath the level of the gangway floor and accessible externally of the platform or the like and preferably extending across the structure. These underslung lockers must of course be confined, as in the case of the main bulkhead or locker spaces, to those parts of the structure outside the chassis units.

The structure may include end units, the unit at one or both ends of the gangway defining an opening into the latter provided with a cover shield adapted to be either closed onto it or extended outwardly as a shelter over it. Alternative kinds of end unit may be made available, so that the cabin can be formed either with plain ends or with bulged ones of sufficient capacity to permit of considerable internal fitting and furnishing.

The invention will next be described in fuller detail as embodied in the constructional forms shown in the accompanying drawings whereof:

Figure 2 is an exploded view of the same caravan showing the main components but with the near side cover shield and end unit omitted for convenience or illustration;

Figures 3 and 4 show fitted end units and

Figure 5 illustrates a suitable basic platform structure and chassis unit for use in conjunction therewith;

Figure 1:
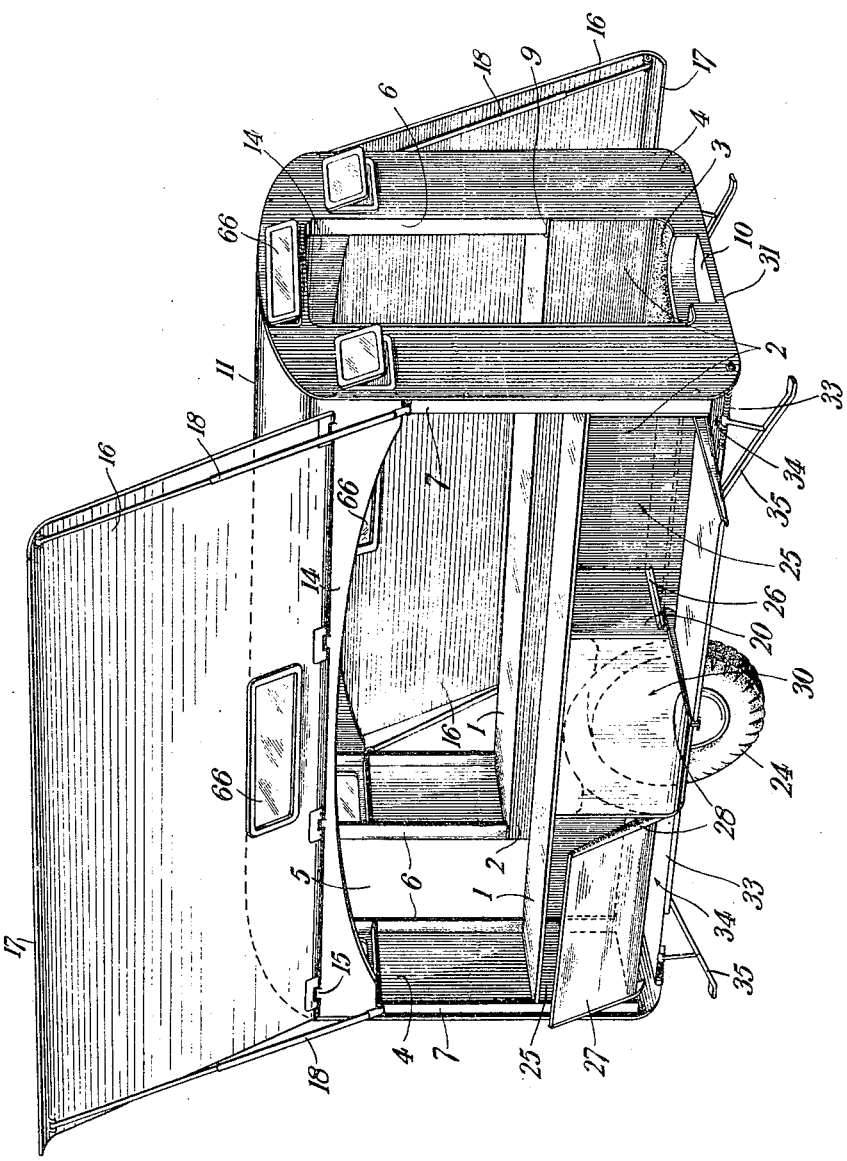
Figure 1 is a general perspective view of a trailer caravan with plain end units.
Figure 9:
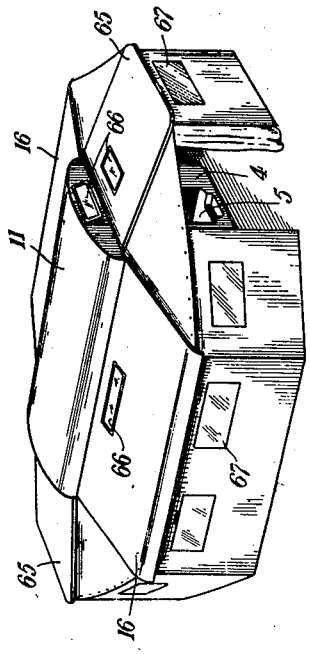
Figure 8:
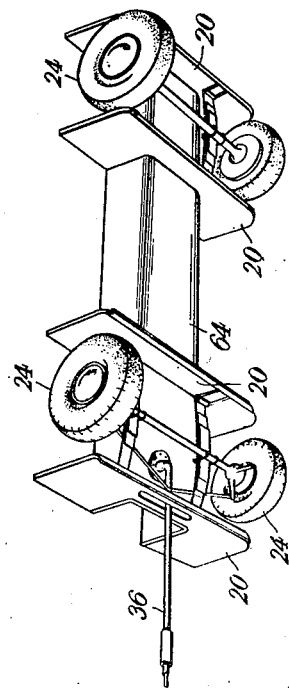

Figure 8 is a perspective view from beneath of the chassis of the same construction; whilst Figure 9 is a general view of the Figure 1 caravan showing the end units provided with cover shields similar to those of the sides and a typical arrangement of tarpaulin or the like extending between and supported by the said cover shields in order to provide extended accommodation when the caravan is pitched.

In the arrangement shown in Figures 1 and 2, the parallel platforms 1 form lateral extensions of the side walls 2 of the gangway backbone channel, having a floor 3 at a convenient depth below the platforms, the whole being an integral section. The end units 4 are similar, each having a central opening 5 in line with the gangway and giving access to an end thereof. Since this opening is preferably of about the same width as the gangway, that part or upright 6 of the frame 7 of the end unit which defines the said opening, may be used to house the end of the backbone whilst the ends of the platforms may be supported on shelves 8 also forming part of the said frame. Slots 9 are cut accordingly in the ends of the gangway-cum-platform member to take the frame uprights 6. If desired the ends of the gangway floor 3 and the bottom edges of openings 5 may be recessed to take steps 10.

The arched roof 11 is preferably of double skin construction and strengthened internally by rounded shelf or rack structures 12 of opposed curvature to that of the roof and between which the head space of the latter is disposed above the gangway. The ends of the roof may be pegged by means of protruding bolts 13 into the correspondingly curved tops of the walls of the end units around the adjacent parts of the framework 7 of the latter, leaving openings in the sides of the cabin beneath arched sides 14 of the roof and above the platforms 1.

Adjacent the spring of the arch of the roof, the exterior thereof is provided with a series of hinges 15 for the respective side wall shields 16 which, when closed down, are adapted to cover the whole of each side of the cabin, the free edges 17 of the shields being curved in as shown, to follow the contour of the lower parts of the end units. In Figure 1 the near shield is shown in a raised position supported at either end by the adjustably telescopic struts 18 whilst the far shield is shown lowered and approaching its closed position. A gutter channel 19 may be provided extending around the roof above the mountings of hinges 15.

The chassis cradle unit shown in Figure 2 comprises the spaced plates 20 arranged transversely of the gangway backbone, the top edges of which plates are channelled at 21 to conform with the section of the gangway backbone and platforms, which are thus fully supported thereby. If desired a lining 22 of thin sheet metal may extend between these top supporting edges of plates 20. Accommodated under mudguards 23 in the spaces on either side of the gangway between the plates are the road wheels 24 and their springs, with the axle passing beneath the floor of the gangway.

Between the chassis cradle plates 20 and the end units facing each respectively, there are formed locker or bulkhead spaces 25 beneath platforms 1 and backing onto the gangway. Shelf supports 26 may be provided on the side walls of these lockers. In the opening of each locker is mounted an outwardly and downwardly opening hinge flap door 27 with extension parts beyond the pivots, which parts may conveniently take abutment upwardly against the shelf supports 26 in order to limit downward movement of the flap door beyond a horizontally extended position. The inwardly facing edge members 28 of these flap doors may be formed, as shown in Figure 1 with flanges, so that when the doors to either side of the chassis cradle are down, a bridging panel 29 may be supported between them as appears in Figure 6, so that a continuous run of external shelving below, but extending out beyond the main platforms 1, can thus be formed along the sides of the cabin. The road wheels are preferably boxed in by removable panels 30 between the outer ends of plates 20.

The lower edges 31 of the end units lie somewhat below the gangway floor 3 and on a level with these 32 of the chassis cradle plates 20. By means of bottom sheathing 33 between these edges, shallow underslung lockers 34 may be provided fore and aft of the chassis cradle and extending if desired, through from side to side of the cabin beneath both the gangway as well as the locker spaces 25, such underslung lockers also being accessible externally of the sides of the cabin and adapted to be covered over by the shields 16. Suitable strut supports for use when the caravan is pitched are indicated at 35 and a possible position for a tow bar coupling at one end of the gangway backbone at 36.

Figure 6:
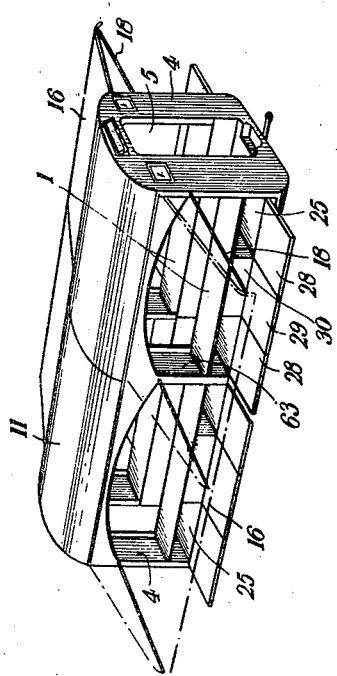
Figure 6 is a general view of a trailer caravan comprising two cabin units similar to that of Figures 1 and 2, fully opened out with the near side cover shields omitted but their extended outlines indicated in dotted lines.

Before concluding this description of Figures 1 and 2, it may be observed that instead of the collapsible side shelving being composite, it might extend integrally from end to end of each side of the cabin without separately operable closures for the individual locker spaces. Referring to Figure 6, it will readily be appreciated how the two flap doors 27 and bridging panel 28 on either side of each cabin unit could thus be combined. Moreover the side shelves or their components need not necessarily be mounted for swinging out on bottom hinges, but may be adapted to be horizontally extended, when required, in any other suitable manner.

Considering now the components shown in Figures 3 to 5, which are intended to be associated with a roof and side wall shields substantially identical with those already described, it will be observed from Figure 5 that the only essential difference in the basic gangway-cum-platform structure, lies in the fact that the side walls 2 of the gangway backbone are not continued as platforms, the latter being in this example skeletonized to form equivalent supports consisting of the top edges 37 of these walls, the top edges 38 of the chassis cradle plates 20 and the outer rails 39 extending along the respective sides of the caravan between the end units thereof on substantially the same level as the said top edges. It is evident that spaces for side and underslung lockers are left just as in the other arrangement.

The projecting extremities of the gangway backbone of Figure 5 are adapted to extend into the housings of the respective bulged end units shown in Figures 3 and 4, wherein the mounted positions of these extremities are indicated in chain dotted lines. The shells 40 of both end units are basically similar, with a central opening 5 corresponding to that of the plain end units previously described. The main rounded parts 41 of shells 40 are of simple curvature suitable for fabrication in such a material as plywood, the corners 42 being completed by appropriate metal stampings. Bumper rails 43 extending horizontally around the curves of the units may be provided at a convenient height for use also as grips in handling the cabin, as for example, by cutting suitable recesses 44 in the adjacent panelling so that the rails can be made substantially flush therewith. Further up, the units may be pierced by window openings 45 also extending horizontally around the simply curved surfaces of the latter.

In the far end unit shown in Figure 3, is fitted a sink 46 with plate rack 47 above, and rubbish chute 48 below. Lower still, is the housing 49 for the end of the gangway backbone. These fittings and parts are all in line with the gangway and with the central opening 5 of the unit. The externally curved spaces to the sides of this opening, may be used to accommodate for example a cooker 50 with locker 51 for gas cylinder under it and a refrigerator 52, with draining board 53 over and space 54 for water reserve tank under, hot and cold water tanks 55 and 56 occupying the respective upper corners. Opening 5 may be covered with an outwardly and upwardly swinging top hinged shield 57 resembling the side shields 16 and affording sheltered external access to the various fittings within the end unit.

The near end unit shown in Figure 4, is designed essentially as an entrance vestibule to the gangway, the externally curved space on one side being used for example as a hanging cupboard and that on the other as a closet 58, an internal door 59 being provided if desired for alternatively shutting off the closet or the entrance from the end unit into the main part of the cabin. A similar shield to 57 may form an external door to the opening 5 of this end unit. It will be seen how parts on either side of the passage through the latter act as a housing for the extremity of the gangway backbone corresponding to housing 49 of the other unit.

The near end parts of the upright sides as well as the bottom of the backbone may be cut away as shown at 60 and 61 in Figure 5 better to fit in with closet 58 and step 62. The cross section of the gangway backbone may also be modified at other places if desired provided this is done without reducing its strength below structural requirements. For instance the side walls may be pierced to give access to the back of locker spaces 25 or in place of one or more of these lockers access to the gangway may be given through the side or sides of the cabin with consequent local lowering of the side wall or walls of the gangway backbone as at 60 and interruption of the platform or platforms.

Figure 7:
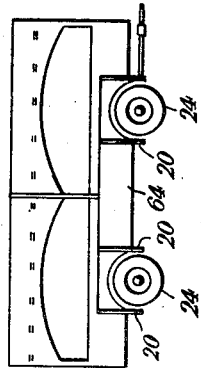
Figure 7 is a diagrammatic side elevation of this double cabin unit construction.

In the Figure 6 arrangement of two standard cabin sections connected end to end, an intermediate partition unit 63 may be used similar to the plain end units 4, but provided with frames 7 on both faces. For the purpose of supporting such a longitudinally extended cabin, a four-wheel cradle chassis is preferable as shown in Figures 7 and 8. This comprises an under channel 64 for receiving the gangway backbones of the two cabin sections nesting within it and embracing the abutting ends of the said backbones. This under channel thus serves in effect as a supplementary backbone, being furnished near either end with pairs of spaced transverse cradle plates 20 and road wheels 24 as already described in the case of the simple gangway backbone. In this four wheel chassis it is desirable for the leading pair of wheels to be steerable with the tow bar 36 as indicated in Figure 8. Channel 64 clearly might be used directly as the gangway backbone of a cabin if desired.

In the typically extended arrangement of Figure 9, the cabin is identical with that of Figures 1 and 2 except that the end units are provided with cover shields 65 similar to those 57 referred to in connection with Figures 3 and 4, but able in the present arrangement to be of substantially the full width of the end units owing to the flatness of the latter. The nature of the tarpaulin or like sections secured between or hanging from the various edges of the extended cover shields 16 and 65 can be clearly understood from the drawing. Ample internal illumination is obtained through the windows 66 of the end sections and of the cover shields together with those 67 of the tarpaulin hangings.

All the components may be secured together in a detachable manner permitting collapsing of the cabin and separation from the chassis if required, e. g. for shipment, whilst the use of standard components when combined with this feature makes possible their free interchangeability besides the flexibility of initial construction which has already been noted.

A cabin or trailer in accordance with the invention having platforms at one level and subsidiary collapsible side shelves at a lower level protected by the cover shields extending out considerably beyond them, lends itself for use as a mobile canteen, office or exhibition vehicle equally well as for camping and the like. Moreover the side shelves may be arranged at about the same height above the ground as the platforms are above the gangway floor, so that the effective area available for bunks, tables and other uses is greatly increased when the cabin is opened out.

I claim:

1. In a cabin structure of the kind described, upright end members, a chassis cradle between and spaced from said end members and including longitudinally spaced, transverse upright members, end portions of which form the ends of associated wheel housings and central portions of which provide upwardly opening recesses, a channel-like structure having end portions engaged with said upright end members and a mid portion engaged in said recesses and providing a longitudinal gangway between said end members, and platform-like supports extending laterally outward from the upper portion of each side of said channel-like structure and engaged at their ends with said end members and engaged at points between their ends upon said end portions of said upright members and covering the top of said wheel housings.

2. In a cabin structure of the kind described, upright end members, a chassis cradle between and spaced from said end members and including longitudinally spaced, transverse upright members, end portions of which form the ends of associated wheel housings and central portions of which provide upwardly opening recesses, a channel-like structure having end portions engaged with said upright end members and a mid portion engaged in said recesses and providing a longitudinal gangway between said end members, platform-like supports extending laterally outward from the upper portion of each side of said channel-like structure and engaged at their ends with said end members and engaged at points between their ends upon said end portions of said upright members and covering the top of said wheel housings, portions of said supports fore and aft said chassis cradle forming the tops of longitudinally separated, open front locker spaces at the sides of the cabin-like structure, and a cover for the open front of at least one locker space and operable to open or to close the same.

3. In a cabin structure of the kind described, upright end members, chassis cradle means between said end members, means attached at its ends to said end members and supported at its mid portion by said cradle means and providing a longitudinal gangway between said end members, a platform-like support along each side of the cabin structure and engaged with said end members and with said cradle means respectively, a top for the cabin structure and engaged with said end members and coacting with said platform-like supports providing open sides for the cabin structure, and a shield associated with each open side of the cabin structure and hinged to the associated side of the top for movement closing or exposing the associated open side, each shield in its closed position terminating at least at the plane of the associated platform-like support.

4. In a cabin structure of the kind described, upright end members, chassis cradle means between said end members, means attached at its ends to said end members and supported at its mid portion by said cradle means and providing a longitudinal gangway between said end members, a platform-like support along each side of the cabin structure and engaged with said end members and with said cradle means respectively, portions of said supports fore and aft said chassis cradle means forming the tops of open front locker spaces at the sides of the cabin structure, closure means associated with the open front of each locker space and movable between positions closing or exposing the same, a top for the cabin structure and engaged with said end members and coacting with said platform-like supports in providing open sides for the cabin structure above said locker spaces, and a shield for each side of the cabin structure and hinged to the associated side of the top for movement closing or exposing the open side and for covering or exposing the closure means for each locker space, said closure means for each locker, when the shield at the associated side of the cabin structure is in its position exposing the same, being capable of being swung into a position forming an outwardly extending platform for the bottom of the associated locker space.

5. In a cabin structure of the kind described, upright end members, chassis cradle means between said end members, a gangway extending longitudinally between said ends and engaged therewith and with said chassis cradle means, said gangway including a floor and upright sides, a platform-like support extending laterally outward from the top of each side of the gangway and engaged with said end members and said chassis cradle means and forming the top for the latter as well as the top of locker spaces spaced longitudinally of and which are open at the sides of the cabin structure, a top for the cabin structure and engaged with said end members and formed to provide open sides for the cabin structure above said platform-like supports, a closure pivoted to parts of each end member and to parts of said chassis cradle means and adapted to be swung upwardly to close the open front of the associated locker space and means pivoted to parts of the top and adapted to be swung downwardly therefrom into a position closing the open sides of the structure and to cover the closures for said lockers when in a position closing the open front of said lockers.

6. A cabin structure for trailers embodying therein upright end members, a platform-like support disposed between said end members and extending outwardly from the upper margin of one side of a gangway, a pair of transverse upright members spaced longitudinally from each other and longitudinally from said ends and forming below said supports a wheel housing separated from said end members by open front locker spaces, a bottom for each locker space, means associated with the front of each locker space to open or close the same, a roof extending between and secured to said end members above said gangway and having a side portion defining the top of an open side for the structure above the platform-like support, and means supported from said side portion of the roof and movable relatively thereto from a position extending outwardly therefrom and uncovering said open side and the open front of said locker space and associated side of the wheel housing, to a position covering the same, and wherein it is engaged at its ends with portions of said end members.

7. In a cabin structure for trailers, the combination of upright end members, a gangway extending between said end members and forming a backbone of channel cross section and including laterally spaced upright sides and a bottom, a platform-like support extending laterally outward from each side of said backbone, a chassis cradle including transversely extending upright members spaced longitudinally of the gangway and formed in the upper portions with upwardly opening recesses in which longitudinally spaced portions of the sides and the bottom of said backbone are engaged for support, portions of said platform-like support between each end member and each adjacent upright member forming the top of associated locker spaces, externally accessible from one side of the structure.

8. A cabin structure according to claim 7 and including an underslung locker extending beneath the level of said backbone in parts of the structure between each end member and each transversely extending upright member.

ARTHUR JOHN ENSOR.

REFERENCES CITED

The following references are of record in the file of this patent:

UNITED STATES PATENTS

| Number | Name | Date |
|---|---|---|
| 540,866 | Mally | June 11, 1895 |
| 1,417,736 | Heygate | May 30, 1922 |
| 1,422,498 | Vint | July 11, 1922 |
| 1,437,172 | Curtiss | Nov. 28, 1922 |
| 1,596,924 | Curtis | Aug. 24, 1926 |
| 1,857,081 | Fontaine | May 1, 1932 |
| 2,003,816 | Allen et al. | June 4, 1935 |
| 2,075,939 | Heyner | Apr. 6, 1937 |
| 2,155,876 | Stout | Apr. 25, 1939 |
| 2,173,076 | Stetson | Sept. 12, 1939 |

FOREIGN PATENTS

| Number | Country | Date |
|---|---|---|
| 766,934 | France | July 6, 1934 |